Aug. 18, 1936.    B. H. SLOCUM    2,051,752
DRIVING MECHANISM
Filed June 28, 1934    6 Sheets-Sheet 1

FIG. 1

Inventor
BURTON H. SLOCUM

Aug. 18, 1936.   B. H. SLOCUM   2,051,752
DRIVING MECHANISM
Filed June 28, 1934   6 Sheets-Sheet 2

Inventor
BURTON H. SLOCUM

Fig. 5

Aug. 18, 1936.  B. H. SLOCUM  2,051,752
DRIVING MECHANISM
Filed June 28, 1934  6 Sheets-Sheet 5

Inventor
BURTON H. SLOCUM
By Milburn & Milburn
Attorneys

Aug. 18, 1936.   B. H. SLOCUM   2,051,752
DRIVING MECHANISM
Filed June 28, 1934    6 Sheets-Sheet 6

FIG. 9

Inventor
BURTON H. SLOCUM

Patented Aug. 18, 1936

2,051,752

UNITED STATES PATENT OFFICE 2,051,752

DRIVING MECHANISM

Burton H. Slocum, Philadelphia, Pa.

Application June 28, 1934, Serial No. 732,944

10 Claims. (Cl. 161—1)

This invention relates to driving mechanism and particularly to electrically-operated driving mechanism for operating the driven member at variable rates per unit of time.

The invention is primarily designed for use as a variable feed drive for stokers, but is adapted to be used for operating other types of mechanism calling for a variable rate of feed.

In mechanism of this character variations in feeding rates of the feeder drives are ordinarily obtained by the use of variable speed motors or constant speed motors with mechanical speed changing devices having variable ratios. Variable speed motors are unsatisfactory for such purposes because of their costliness and certain fundamentally unsuitable characteristics. With this type of motor the feeding rate is difficult to control and cannot be varied and regulated in the manner and to the degree necessary or desirable in the efficient and economical operation of feeder drives.

Efforts have accordingly been made to utilize a relatively inexpensive constant speed motor with a speed changing device having a fixed ratio for obtaining a variable feed from the shaft which operates the feeder mechanism. In order to regulate the feeding rate the feeder operating shaft is given an intermittent action by being stopped and started at fixed intervals. The total proportionate length of the rest periods of the intermittently actuated shaft relative to its operating periods in any given time determines the feeding rate. Variation of the feeding rate is effected by changing the length and/or frequency of the rest periods.

The mechanism generally employed for producing such variable feed comprises, in addition to a constant speed motor, a speed changer or reduction gear, a clutch mechanism and a regulating device for introducing and varying the rest periods of the feeder operating shaft.

Exactly accurate functioning of these elements and their close and smooth cooperation are essential to the efficient and satisfactory operation of the feeder mechanism, its proper regulation and long-continued service. The regulating device should be so designed and constructed as to insure minute and accurate variation and control of the feeding rate throughout the entire feeding range. The clutch mechanism must be of such character as to function quickly and positively and to withstand the frequently repeated clutching and de-clutching operations imposed by the regulating device.

The variable feed mechanisms of this general character heretofore known have been unsatisfactory and defective in these and other particulars. In the operation of such prior mechanisms it has been impossble to vary or control the feeding rate uniformly or closely. Moreover, in the intermittent functioning of such mechanisms, the operation of the clutch and the stopping and starting of the feeder-operating shaft, have resulted in serious shock at each clutching operation. These shocks, repeated at frequent intervals, have caused such strain and undue wear upon and heavy damage to the mechanism as to interfere seriously with its operation and shorten its life.

One of the principal objects of my invention is to provide a compact economical and highly efficient feeder driving mechanism with a direct connected constant speed motor.

A further object is to provide a variable feed drive so designed and constructed that the feeding rate may be varied by infinitesimal amounts over the entire feeding range.

Another object is the provision of regulating means for effecting the changes in feeding rate from minimum to maximum by the operation of a single control device operable manually or by an automatic pressure regulator, the rate of change being preferably directly proportional to the movement of the regulating control device and the feeding rate being accurately indicated thereon.

Another object is the provision of clutching and braking means controlled by and efficiently cooperating with a regulating timing element for varying the feeding rate under all conditions and to suit all requirements.

Another object of the invention is the provision of clutch mechanism so designed and constructed as to permit a large number of engagements per minute without shock to or undue wear upon cooperating parts.

A further object is the provision of clutch and brake mechanism so constructed and arranged that any wear on either may be taken care of by manipulation of a single readily accessible adjusting element.

Another object is the association with the regulating device of means by which the selective setting of that device may be effected automatically, if desired, by mechanical or electrical connection with suitable pressure regulators.

Among other objects are the provision of a compact and convenient gear housing, a lubricating means and a means for changing the intermittent action of the feed mechanism to a continuous drive when desired.

These and other important objects of the invention will be apparent from the following description of the invention and from the drawings illustrative of a preferred embodiment thereof.

Broadly described, the invention comprises a reduction gear A, clutch B, brake C and regulating device D. The drive is single speed. An extension of the shaft of a vertical motor runs through a hollow worm shaft of the reduction gear, the two shafts being connected by a plate friction clutch, forced into engagement by the worm thrust. The thrust of the worm is opposed and the clutch disengaged at regulated intervals by energizing a solenoid acting on a preferably disengaged 10:1 ratio lever. The energizing and de-energizing period of the solenoid are controlled by a piston in the regulating device D, the piston being moved vertically to its up position by a rack and pinion operated with a gear reduction from the crank shaft. The return of the piston to its lower position is fluid regulated by hand or automatic control.

The reduction gear A provides a relatively slow output speed of the feeder drive, derived from a constant speed motor and suitable for the various feeder purposes for which the invention is intended. The invention does not depend upon and is not limited to use with a motor of any particular speed. By way of example merely, the reduction gear illustrated is designed for use with a 1740 R. P. M. motor.

The high speed set of the reduction gear comprises a worm 55 preferably integral with a hollow shaft 350 surrounding and adapted to be driven by drive shaft 28 of a suitable motor 300 and a wheel 54 fixed to a stub shaft 40; the low speed set comprises a pinion 53 on shaft 40 and a spur gear 52 on crank shaft 5. In the example illustrated the high speed set has a ratio of 18⅔ to 1 and the low speed set a ratio of 8.77 to 1. The total ratio of approximately 164 to 1 gives an output speed of 10.6 R. P. M. from a 1740 R. P. M. motor, which is suitable for the ordinary purposes of the drive. A higher or lower output speed to provide a greater or lesser maximum feed rate for any particular purpose may be obtained by a simple alteration of the gear ratio.

The gears and shafts of the reduction gear are mounted within a preferably integral cast metal housing 1. In assembling the gearing the gears are lowered into position through an opening in the top of the housing 1 closed by cover 3. The crank shaft 5 is drawn tightly into the taper bore 14 of gear 52 by plate 21 and bolt 7 and secured therein by key 6; the opposite end of the crank shaft is mounted in pedestal bearing 2 removably secured to housing 1 by bolts 97. The shafts 28, 40 and 5, when in position, are mounted upon suitable antifriction bearings 80, 82 and 84, respectively.

The worm 55 of the reduction gear is provided with a helix angle sufficiently high to insure an efficient drive and also to enable the drive to be reversed momentarily by applying a force at the crank shaft end. The worm preferably stands in a vertical position, this arrangement permitting the use of a vertical motor upon a simple mounting bracket and affording a compact drive. The vertical disposition of the worm drive also facilitates the functioning of the clutch B.

The motor 300 is preferably mounted upon a base 9 and supported upon the housing 1 by posts 26. The motor shaft 28 is provided with an improved safety coupling.

In driving mechanisms of this general type a shearing pin coupling or other safety device is usually provided, in order to disconnect the motor and permit its continued operation at full speed without damage to the drive when the feed mechanism encounters obstructions preventing its proper operation. The shearing pin wire in couplings of this type is usually inserted in steel bushings to insure a clean shearing of the wire and prevent undue wear.

In my improved coupling the shearing pin bushings are so mounted as to be readily accessible and removable, the usual difficulty in removing the sheared wire from the bushings being obviated.

My coupling comprises a driving sleeve 60, keyed to the motor shaft 68, a driving spider 59 rotatably mounted on sleeve 60, a driving collar 61 and a driven coupling member 62. Driving spider 59 is held in position on sleeve 60 between a flange on the lower end of the sleeve and the driving collar 61.

Shearing pin bushings 65 are inserted in aligned bores in split lugs 67 and 69 and clamped in position by bolts 99. The shearing pin 66 is held in the bushings 65.

Links 63, preferably of leather or similar material, are bolted at one end to arms on the driving spider 59 and at the other end to arms on driven coupling member 62.

The ready accessibility of the motor shaft coupling is due in part to the construction of the motor support. The support is not only compact, but is semi-flexible and self-aligning and adaptable to different types of motors. The adapter plate 9, which fits the motor, is mounted on the studs or posts 26 which hold the bearing container 13 in position. The adapter plate 9, posts 26 and bearing container 13 are machined to insure proper alignment of the motor shaft 68 with the motor shaft section 28 which is associated with and in effect forms a part of the gear unit. The semi-flexibility of the motor support is provided by the posts 26, which are made of such length and thickness as to permit a slight flexibility.

The clutch mechanism consists of an outer clutch member 22 fixed to drive shaft 28 by keys 38 and carrying a series of clutch plates 89, preferably of bronze, interleaving with a series of clutch plates 90, preferably of steel, secured by keys 88 to the inner clutch member 87, shown as integral with the hollow worm shaft 350.

Operation of the clutch is effected by vertical movement of worm shaft 350 which, for this purpose, is slidably, as well as rotatably, mounted on the drive shaft 28 by means of bushings 37 of bronze or other suitable material.

The holding force for the clutch plates 89, 90 is provided by the thrust of the worm 55, which is always downwardly, by virtue of the helix angle of the worm and its direction of rotation. This holding force is supplemented by the weight of the vertically mounted worm. The parts are so designed and proportioned that engagement of the clutch insures a positive drive under all load conditions, slippage of the clutch requiring a considerably greater torque than the driving torque from the worm.

Release of the clutch is effected by upward sliding movement of worm shaft 350 upon the energization of a solenoid 310 provided for this purpose. An eye bolt 31 secured to solenoid plunger 311 extends through a trunnion 32 on the end of a lever arm 27, from which it is suspended by nuts 106. The lever arm is clamped or otherwise secured to a yoke 23 fulcrumed upon the upper end of a bolt 49 by pivot pin 30. The arms of the yoke are pivotally secured to a pair of bolts 51 slidably positioned in and extending through bushings 29 in the yoke and through the bearing container 13 of housing 1. Each bolt is secured, at its lower end, to a brake plate 24 provided with a brake shoe 46 disposed beneath an annular flange 312 on the worm shaft 350.

When the solenoid 310 is energized plunger 311 and eye bolt 31 are pulled down, tilting lever 27 and yoke 23 on the fulcrum pin 30 and raising the bolts 51, thereby sliding brake plate 24 upwardly to bring brake shoe 46 into engagement with flange 312 and sliding the worm shaft 350 upwardly until the upper face of flange 312 is brought into braking engagement with the under side of bearing container 13, thus augmenting the braking of shoe 46 on flange 312.

The movement of bolts 51 is practically vertical, a slight rotation of the cylindrical projections of yoke 23 in bushing 29 and a similar degree of sliding action of fulcrum pin 30 upon the head of bolt 49 being permitted.

The upward movement of the worm shaft 350 thus effected disengages the clutch B at the same time that it applies the braking action which stops the rotation of the worm 55.

When the solenoid is de-energized in the present illustrative arrangement, the parts are restored to normal clutch-engaging, brake-released position by the weight of the worm shaft 350, since the weight of the plunger 311, which would otherwise tend to maintain the parts in disengaged clutch position, is counterbalanced by springs 39 secured to housing 1 and lever 27.

The proper normal clearance of the worm shaft flange 312 having once been obtained, by placing shims under the clutch plates, and adjusting bolt 49, all further adjustments are made by nuts 106.

Lubrication of the principal moving parts is provided by pump impellers 317 on the outer clutch member 22 which force oil around lower bearing 80 down into pump head 12 and through an axial bore 315 and radial openings 316 in drive shaft 28. The oil thus supplied to the upper bearing 80 is picked up by grooves 313 and 314 in bushings 37 to lubricate the entire extent of the contacting surfaces of worm shaft 350 on drive shaft 28. Apertures 318 are provided in outer clutch member 22 for return of the oil into the housing 1.

The operation of the clutch device is controlled by regulating device D, which times the clutching and de-clutching action and determines the length of the rest periods for selectively producing any predetermined feeding rate practically up to the motor speed. The start and stop action of the mechanism is timed to occur on dead centers, where the starting load is at its minimum.

Regulating device D comprises a timing element including a piston 210 having relatively free action on its upward stroke and adjustably restricted action during its downward stroke; connections for driving the piston upwardly by rotation of the crank shaft 5; and a pivotally mounted electrical switch 246 tiltable by reciprocation of the piston 210 to close and open the circuit to solenoid 310 to stop and start the rotation of crank shaft 5. The adjustable timing and regulating action of the device occurs upon the downward stroke of piston 210, the upward stroke, performed during rotation of crank shaft 5, resetting the device for its next timing stroke.

These operative parts of the regulating device are enclosed in a case 201, which, for convenient connection of the driven parts to the crank shaft 5, may be mounted upon the pedestal bearing 2 by bolts 320 or other suitable securing means.

The lower portion of the case is formed as a well 202 to receive the piston 210 and its cylinder 203 and to contain the fluid, preferably oil, in which the piston works.

Figure 1:
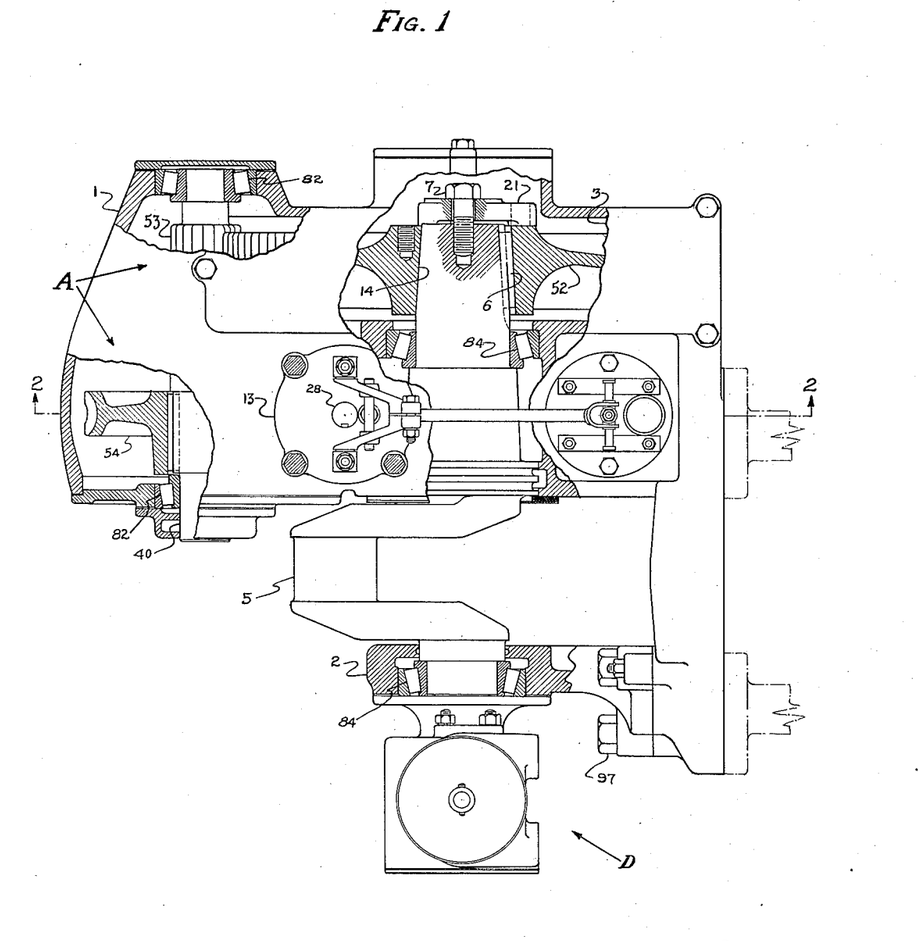
Figure 1 is a top plan view of the complete invention, parts being shown in section and other parts being omitted.
Figure 2:
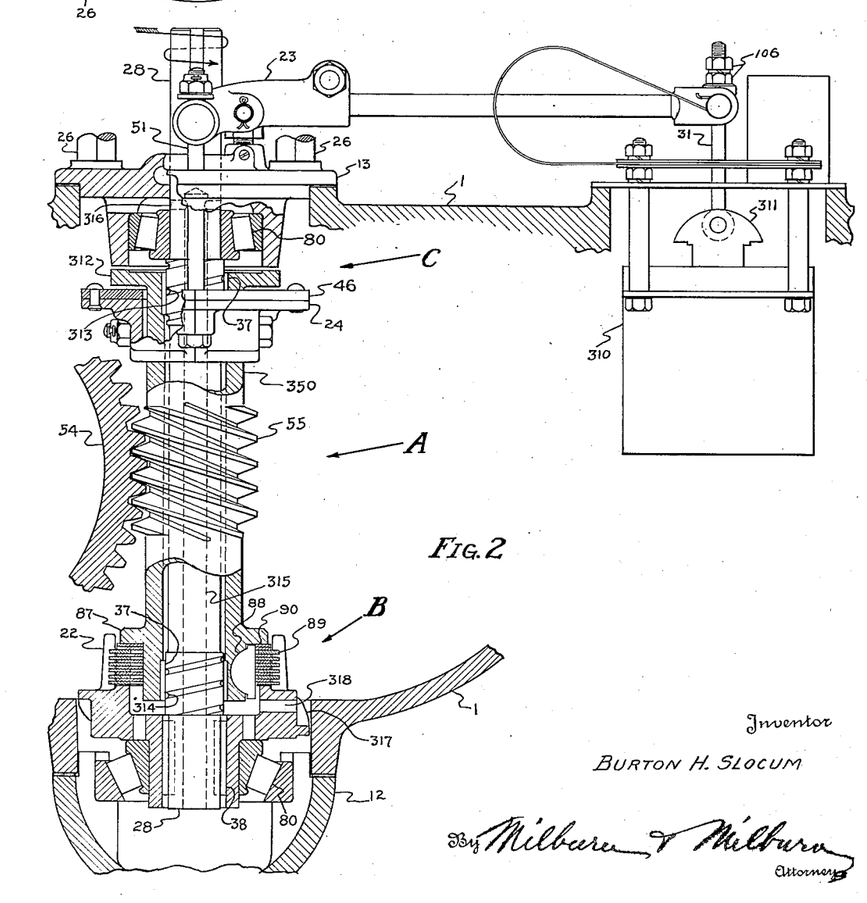
Figure 2 is a vertical elevational view of the clutch and brake mechanism illustrated in Fig. 1, taken on line 2—2 of that figure.
Figure 3:
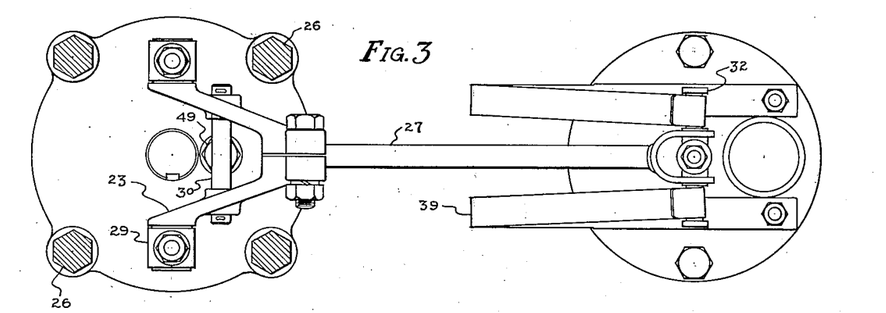
Figure 3 is a top plan view of the mechanism shown in Figure 2.
Figure 4:
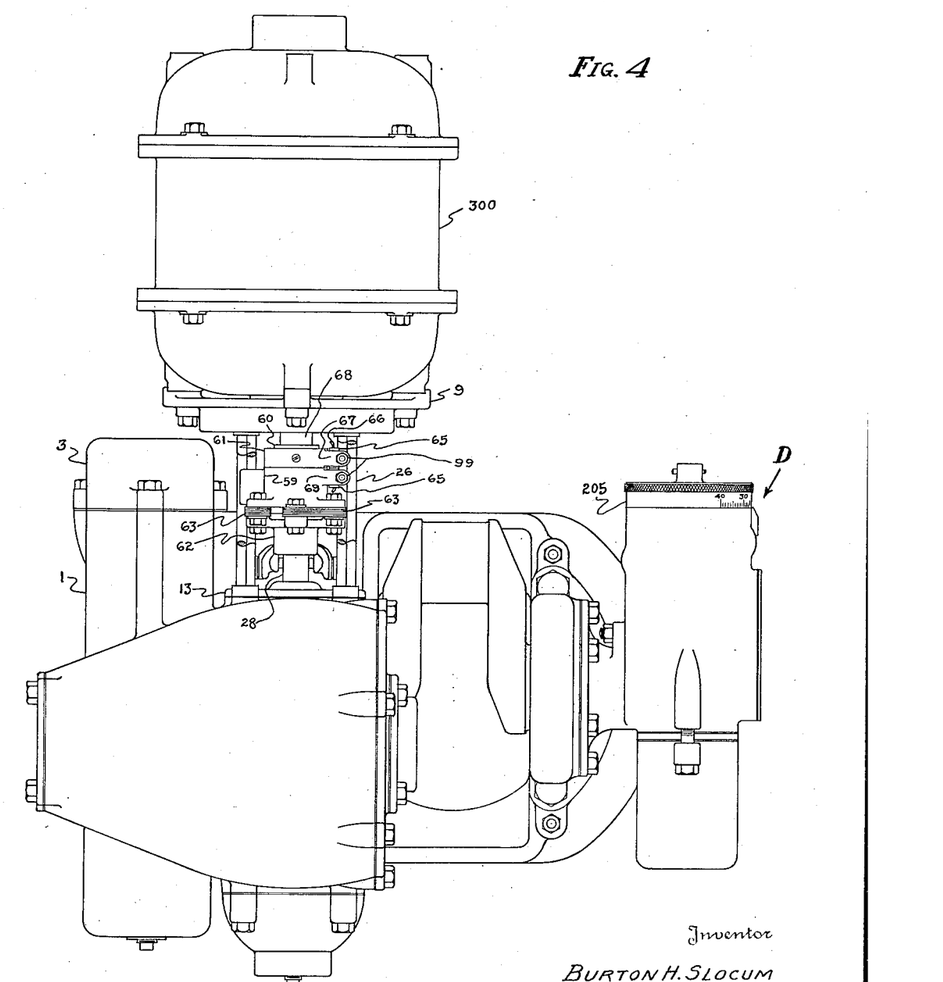
Figure 4 is an end elevational view taken from the left of Figure 1, and showing the motor and its mounting.
Figure 5:
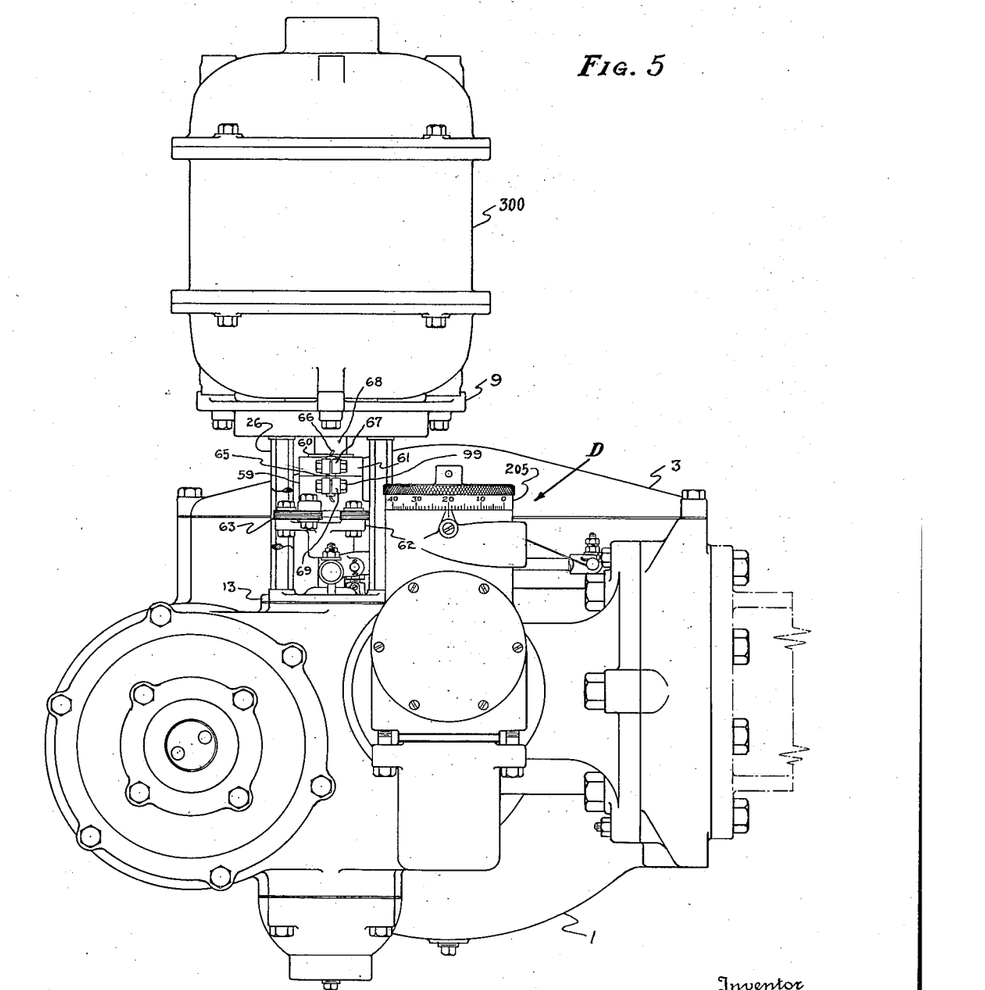
Figure 5 is a side elevational view taken from the right side of Figure 4.
Figure 6:
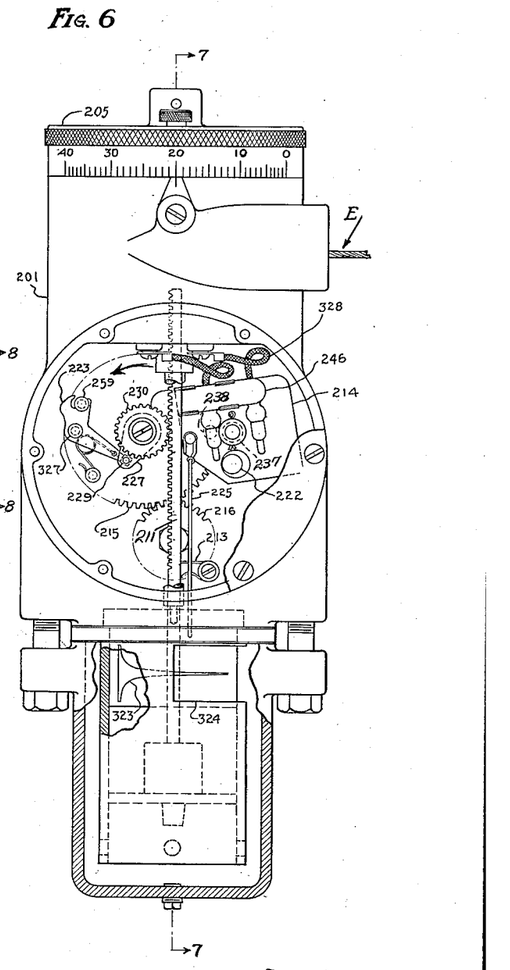
Figure 6 is a vertical elevational view, partly in section, of the regulating device shown in Figures 4 and 5.
Figure 7:
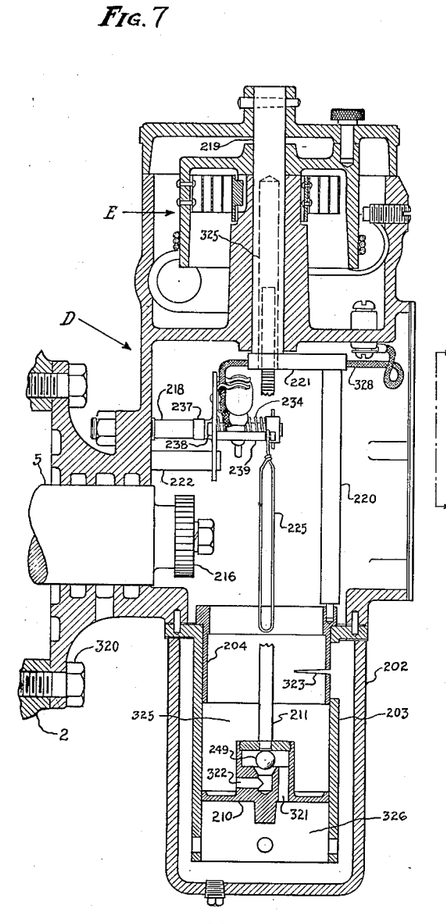
Figure 7 is a vertical sectional view, taken on line 7—7 of Figure 6.
Figure 8:
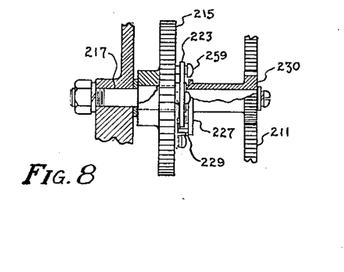
Figure 8 is a detail view of a portion of the device illustrated in Figure 6, taken on line 8—8 of that figure.

The piston 210 operates within the open-ended cylinder 203 which is spaced from the walls of the well 202 to form upper and lower fluid chambers 325, 326. The passage of fluid between these chambers is controlled by a check valve 249, so disposed that passages 321, 322 are closed during the downward piston stroke, and open during the upward stroke, as shown in Fig. 7. A rotatably adjustable ring 204 having an orifice 323 is adapted to be brought into complete registration or varying degrees of partial registration with an aperture 324 in the wall of piston cylinder 203. The shape of the orifice 323 is calculated to provide exactly accurate control of the piston operation so as to furnish uniform and practically micrometrical regulation of the feeding rate by a simple manual adjustment of the ring 204 by turning of the graduated dial 205. This dial is secured to shaft 219, which is connected to radius arm 221, an extension finger 220 of which engages orifice ring 204. By turning dial 205, manually or by means of suitable connections E with an automatic pressure regulator (not shown), the effective size of the opening 323 which is exposed by registry with aperture 324 is adjusted.

The resetting (upward) movement of the piston 210 is accomplished by the rotative engagement of pinion 216 on the end of crank shaft 5 with a timing gear 215, mounted on a stud 217. The rotation of gear 215 is transmitted by trigger 223, pivotally mounted at 327 on the gear, and in driving engagement with a pin 229 on an arm 227 secured to the extended hub of pinion 230. The pinion 230 is rotatably mounted on stud 217 and meshes with the teeth of a rack 211 secured to piston 210. The rack is guided in its movement by the walls of a bore 325 in shaft 219 in which it is positioned for this purpose.

The timing gear 215 rotates counter-clockwise. The ratio of pinion 216 to gear 215, in the example illustrated, is 2 to 1, so that two revolutions of the crank shaft are required for one revolution of timing gear 215. This ratio can be increased or decreased according to the requirements of the drive and the particular feeding rate desired, although the ratio described is sufficient for all normal purposes.

The switch panel 214, which carries a switch 246 preferably of the mercury tube type, for closing and opening the solenoid circuit, is mounted on a stud 218 and is held in normal open circuit position by gravity aided by a spring 234, with a capability of oscillation of a few degrees in either direction about the stud, its oscillation being limited by stop pin 222.

The panel is provided with a contact button 238 for engagement by a pin 259 on timing gear 215 by which the switch is tilted to close the circuit through wires 328 connected to the circuit of the solenoid 310.

Switch 246 is tilted to reverse position by hook 213 on rack 211 engaging the bottom of loop 225. When the switch is thus oscillated counter-clockwise the panel pushes against spring 234 so that button 238 is forced past pin 259.

As the piston makes its downward movement the oil is forced out of the chamber 326 in the lower end of cylinder 203 up the outside of the cylinder and through aperture 324 and orifice 323 into the upper chamber 325. During this stroke the pressure of the oil forces the ball valve 249 firmly to its seat so that the liquid is forced to pass through the timing orifice. The rate of fall of the piston is controlled by the size of the orifice 323 which is exposed.

At the end of the downward stroke of the piston, the hook 213 on its rack 211, working within the loop 225, engages and pulls down upon the bottom of the loop and tilts the panel 214 to which it is connected, thus moving switch 246 to circuit-opening position.

In the resetting operation, consummated in the present example during two revolutions of the crank shaft 5 and its pinion 216, the rack 211 is gradually brought up to the starting position by pinion 230, driven by trigger 223, rotating with timing gear 215. At about the end of the second revolution of the crank shaft and slightly before the switch 246 is operated the bifurcated end of trigger 223 strikes a bushing 237 on stud 218 and its opposite end is thrown out of engagement with the pin 229 on arm 227, thus destroying the operating connection between timing gear 215 and pinion 230 and releasing the rack and piston for downward movement. Under the influence of gravity the piston thereupon starts its downward stroke.

The timing gear 215 continues to rotate for a brief period after trigger 223 has released the piston and until its pin 259 engages a button 238 and tilts the switch panel 214 in a clockwise direction to close the solenoid circuit. When the switch panel has turned a few degrees the electrical contact in switch 246 is made, and the circuit to the solenoid is closed, the energization of the solenoid releasing the clutch B and applying the brake C.

The piston continues on its downward movement until near the bottom of its stroke the hook 213 operates the switch 246 to open the circuit and permit the rotation of crank shaft 5 and the carrying out of the next resetting operation.

By providing holes in the wall of cylinder 203 near its bottom the movement of the piston 210 is increased near the bottom of its downward stroke and the throwing of switch 246 is effected more quickly.

Regulator D, constructed and operating as shown and described, and cooperating with my improved clutch and brake mechanism, affords smooth and efficient operation at all times and under any and all load conditions, and enables the feeding rate to be varied with practically absolute accuracy and uniformity by considerable or infinitesimal amounts at any point in the feeding range.

Figure 9:
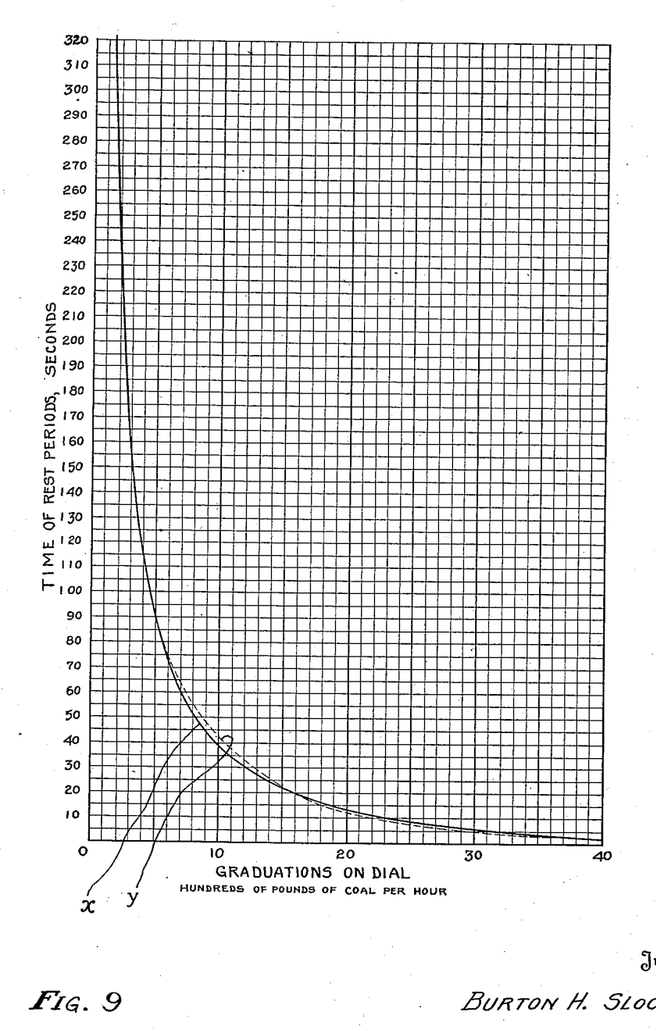
Figure 9 is a diagrammatic view of comparative curves representing theoretical and actual performances for the regulator action of my invention.

The character of performance of the apparatus is apparent from a comparison of the curves shown on Fig. 9. The graduations of the dial 205 shown on the horizontal scale in that figure, represent feeding rates, for example in hundreds of pounds of coal per hour based on 7 pounds per ram stroke. The corresponding rest periods required to give these feeding rates are shown in seconds of time on the vertical scale.

The full line curve X represents theoretically correct values and perfect performance. The broken line Y gives the actual values obtained with my improved mechanism; its practical identity with the theoretical curve X is sufficient indication of the accuracy of adjustment, timing and operation of my invention.

I claim:

1. A driving mechanism comprising a drive shaft, a vertically positioned hollow driven shaft axially slidable upon said drive shaft, coacting clutch elements on said drive shaft and said driven shaft, respectively, a radial flange on said driven shaft, shifting means engageable with said flange for axially sliding said driven shaft to disengage said clutch elements and apply braking action to said driven shaft flange, regulating means actuated by rotation of said driven shaft for operating said shifting means at predetermined intervals for stopping and starting said driven shaft, and means for adjusting said regulating means to vary the rate of the intermittent operation of said driven shaft.

2. A driving mechanism comprising a drive shaft, a vertically positioned hollow driven shaft axially slidable upon said drive shaft, coacting clutch elements on said drive shaft and said driven shaft, respectively, a worm on said driven shaft, an operating shaft, gearing connecting said worm and said operating shaft, regulating means actuated by rotation of said operating shaft for disengaging said clutch at predetermined intervals, the reengagement of said clutch elements being effected by gravitational sliding movement of said driven shaft.

3. A driving mechanism comprising a drive shaft, a vertically positioned hollow driven shaft axially slidable upon said drive shaft, coacting clutch elements on said drive shaft and said driven shaft, respectively, a radial flange on said driven shaft, shifting means engageable with said flange for axially sliding said driven shaft to disengage said clutch elements and apply braking action to said flange, a crank shaft, a worm on said driven shaft, reduction gearing connecting said worm and said crank shaft, electrical means for actuating said shifting means, a switch for opening and closing the circuit for said electrical means, a dash pot, means connecting said dash pot with said switch for throwing said switch to deenergize said electrical means and permit the operation of said driven shaft, means actuated by rotation of said crank shaft for setting said dash pot and throwing said switch to circuit closing position to disengage said clutch and apply said braking action to stop said driven shaft, and means adjusting the speed of operation of said dash pot to vary the length of the rest periods of said driven shaft and said crank shaft.

4. A driving mechanism comprising a drive shaft, a driven shaft, a clutch connecting said drive shaft and said driven shaft, electrical means for releasing said clutch to stop said driven shaft, said clutch returning to engaged position upon deenergization of said electrical means, a dash pot including a plunger, a rack secured to said plunger, a pinion engaging said rack, plunger-setting means connecting said driven shaft and said pinion for elevating said rack and plunger by rotation of said driven shaft through a predetermined fixed period of operation, an electrical switch, means actuated by said setting means for releasing said rack and plunger and throwing said switch to release said clutch and stop said driven shaft, said plunger descending by gravity, means carried by said plunger for throwing said switch near the end of the downward stroke of said plunger to engage said clutch and start the rotation of said driven shaft, and means for regulating the speed of downward movement of said plunger to determine the length of the rest periods of said driven shaft.

5. A regulating device for varying the rate per unit of time of an intermittently operated shaft, comprising a shaft, a dash pot including a plunger, a rack secured to said plunger, a pinion engaging said rack, plunger-setting means connecting said shaft and said pinion for elevating said rack and plunger by rotation of said shaft, a tiltable mercury switch, means for tilting said switch by said setting means to stop the rotation of said shaft after a predetermined fixed period of rotation, said plunger descending by gravity, means carried by said plunger and operable near the end of the downward stroke of said plunger for tilting said switch to reverse position to start the rotation of said shaft, and means for regulating the speed of downward movement of said plunger to vary the length of the rest periods of said shaft.

6. A regulating device for varying the rate of an intermittently operated shaft, comprising a shaft, a dash pot having a cylinder spaced from the outer walls of the dash pot, said cylinder being open at its bottom and provided with an aperture above the operating range of said plunger, a rotatable ring fitting against said cylinder, said ring having a tapered orifice adapted to be brought into varying degrees of registration with said aperture to vary the rate of flow of fluid from one side of said plunger to the other during its downward stroke, manual means for rotating said ring to vary the speed of downward movement of said plunger, said plunger having a passage therethrough, a check valve for closing said passage during the downward movement of said plunger, a rack secured to said plunger, a pinion engaging said rack, plunger-setting means connecting said shaft and said pinion for elevating said rack and plunger by rotation of said shaft, a tiltable mercury switch, means for releasing said rack and for tilting said switch by said setting means to stop the rotation of said shaft after a predetermined fixed period of rotation of said shaft, said plunger descending by gravity, and means carried by said plunger and operable near the end of the downward stroke of said plunger for tilting said switch to reverse position to start the rotation of said shaft.

7. Driving mechanism for intermittently operating a driven feeder shaft from a continuously rotating motor shaft, said mechanism comprising a combined clutch and brake mechanism for disconnecting and stopping said driven shaft, electrical means for operating said clutch and brake mechanism, a tiltable mercury switch controlling said electrical means, an adjustable dash pot mechanism for determining the length of the rest period of the intermittently operated shaft, and resetting means for the plunger operating during the rotation of said shaft and actuating said switch to stop said shaft upon the completion of its predetermined operating period.

8. Driving mechanism for intermittently operating a driven shaft from a power shaft comprising electrical means for stopping said driven shaft, said means including a switch, an adjustable delay mechanism for determining the length of the rest period of the intermittently operated shaft, and resetting means for the delay mechanism operating during the rotation of said intermittently operated shaft and actuating said switch to stop said intermittently operated shaft upon the completion of its predetermined operating period.

9. Driving mechanism for intermittently operating a driven shaft from a power shaft comprising electrical means for stopping one of said shafts to effect intermittent operation thereof, said means including a switch, a hydraulic regulator for determining the length of the rest period of the intermittently operated shaft, and resetting means for said regulator operating during the rotation of said intermittently operated shaft and actuating said switch to stop said shaft upon completion of its predetermined operating period.

10. In combination, a continuously rotating shaft, a driven shaft operated thereby, electrical means for stopping said driven shaft, said means including a switch, an adjustable delay mechanism for determining the length of the rest period of the intermittently operated shaft, and resetting means for the delay mechanism operating during the rotation of said intermittently operated shaft and actuating said switch to stop said intermittently operated shaft upon the completion of its predetermined operating period.

BURTON H. SLOCUM.